United States Patent
Guan et al.

(10) Patent No.: US 6,666,034 B1
(45) Date of Patent: Dec. 23, 2003

(54) HYDROGEN STORAGE AND TRANSPORTATION SYSTEM

(75) Inventors: Jin-Chin Guan, Taipei Hsien (TW); Ming-Tarng Yeh, Taipei Hsien (TW)

(73) Assignee: Hsu-Yang Technologies Co., Ltd., Taipei Hsien (TW)

( * ) Notice: Subject to any disclaimer, the term of this patent is extended or adjusted under 35 U.S.C. 154(b) by 0 days.

(21) Appl. No.: 10/217,468

(22) Filed: Aug. 14, 2002

(51) Int. Cl.⁷ .................................................. F17C 11/00
(52) U.S. Cl. .......................................... 62/46.1; 62/46.2
(58) Field of Search ................................ 62/46.1, 46.2

(56) References Cited

U.S. PATENT DOCUMENTS

| | | | | |
|---|---|---|---|---|
| 4,134,491 A | * | 1/1979 | Turillon et al. .............. 62/46.1 |
| 4,249,654 A | * | 2/1981 | Helversen .................... 62/46.2 |
| 4,566,281 A | * | 1/1986 | Sandrock et al. ............ 62/46.2 |
| 4,583,638 A | * | 4/1986 | Bernauer et al. ............ 62/46.2 |
| 4,609,038 A | * | 9/1986 | Ishikawa et al. ............. 62/46.2 |
| 4,723,595 A | * | 2/1988 | Yasunaga et al. ............ 62/46.2 |
| 4,736,779 A | * | 4/1988 | Bernauer ..................... 62/46.2 |
| 4,756,163 A | * | 7/1988 | Garg ........................... 62/46.1 |
| 5,697,221 A | * | 12/1997 | Sapru et al. .................. 62/46.2 |
| 5,953,922 A | * | 9/1999 | Stetson et al. ............... 62/46.2 |

* cited by examiner

*Primary Examiner*—William C. Doerrler
(74) *Attorney, Agent, or Firm*—Troxell Law Office PLLC

(57) ABSTRACT

A hydrogen storage and transportation system is composed of hydrogen storage alloy, a storage tank, a control valve unit and a heat exchange system, wherein the hydrogen storage alloy stores hydrogen in a solid state, the storage tank is loaded with hydrogen storage alloy, the control valve unit is a passage to control hydrogen flow, and the heat exchange system regulates the pressure and flow rate for the hydrogen storage alloy to absorb and release hydrogen. The system enables hydrogen storage in low pressure and high density. Thus, the system also facilitates hydrogen transportation with dual performance in both safety and efficiency. The system will establish a foundation for future hydrogen energy industry.

4 Claims, 5 Drawing Sheets

HYDROGEN STORAGE AND TRANSPORTATION SYSTEM

FIELD OF THE INVENTION

The present invention relates to a safe storage and transportation system, especially a safe system for hydrogen storage and transportation.

BACKGROUND OF THE INVENTION

While petrochemical energy sources like oils, coals . . . etc. contribute industrial revolution, emission of the compounds containing carbon, nitrogen, sulfur . . . etc. and the heat has long polluted earth ecology. To reduce the public hazards from petrochemical energy, it is necessary to develop substitute energy sources. Presently, hydrogen energy is the green energy source that meets the environmental protection most.

Traditionally, hydrogen energy is utilized in the form of thermal energy, chemical energy or electrical energy. The high pressure gas storage for hydrogen energy application is very dangerous, so safe storage and transportation for hydrogen is the bottleneck for current hydrogen energy application.

In view of this, the present invention aims to solve the storage and transportation problem for hydrogen energy by developing a very unique hydrogen storage alloy and providing a "hydrogen storage and transportation system" that hydrogen is absorbed in hydrogen storage alloy to maintain in a solid state and released easily by triggering the control valve for use. The present invention offers a solution to solve safe storage and transportation problem with hydrogen energy and gives a preferred practical embodiment for hydrogen energy utilization.

The features, objectives and implementation for the present invention are described in details as follows.

DETAILED DESCRIPTION OF THE INVENTION

Figure 1:
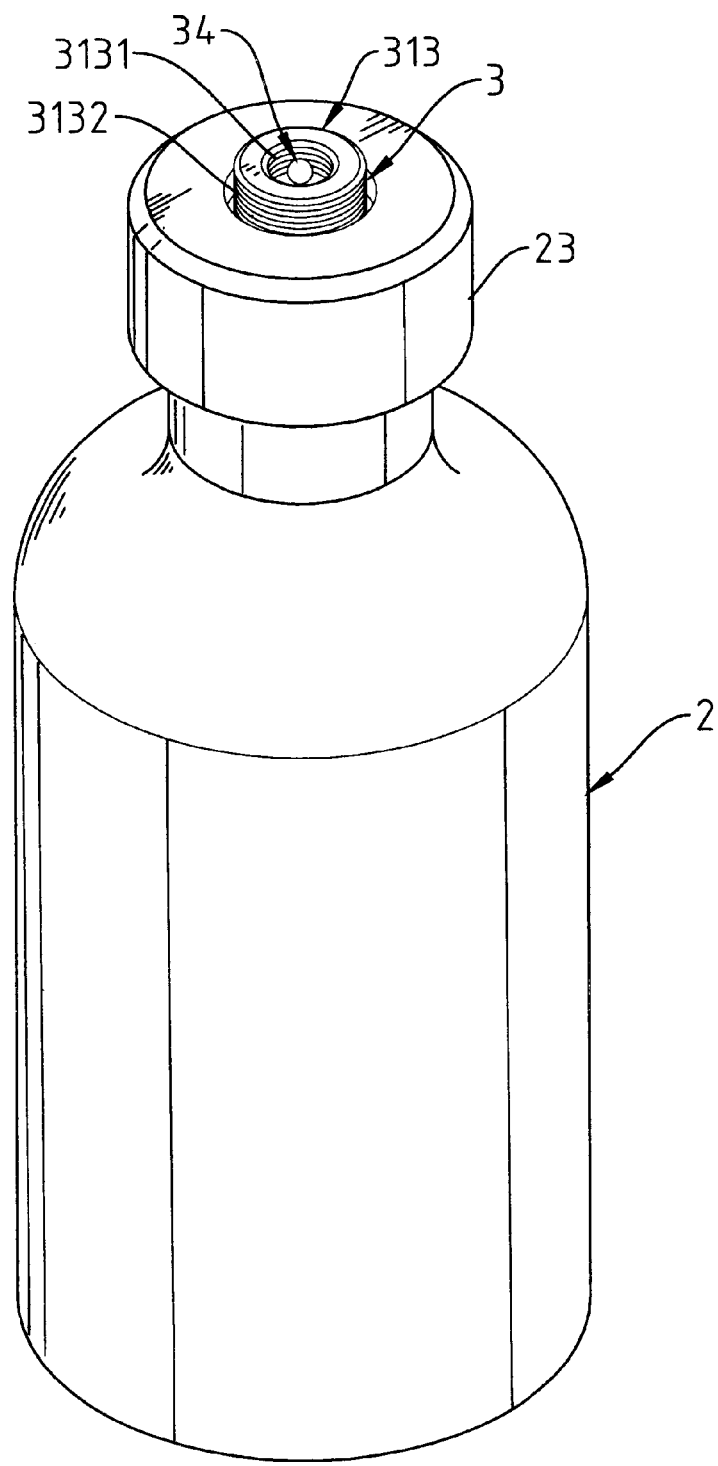
FIG. 1 illustrates a three-dimensional view for the present invention.
Figure 2:
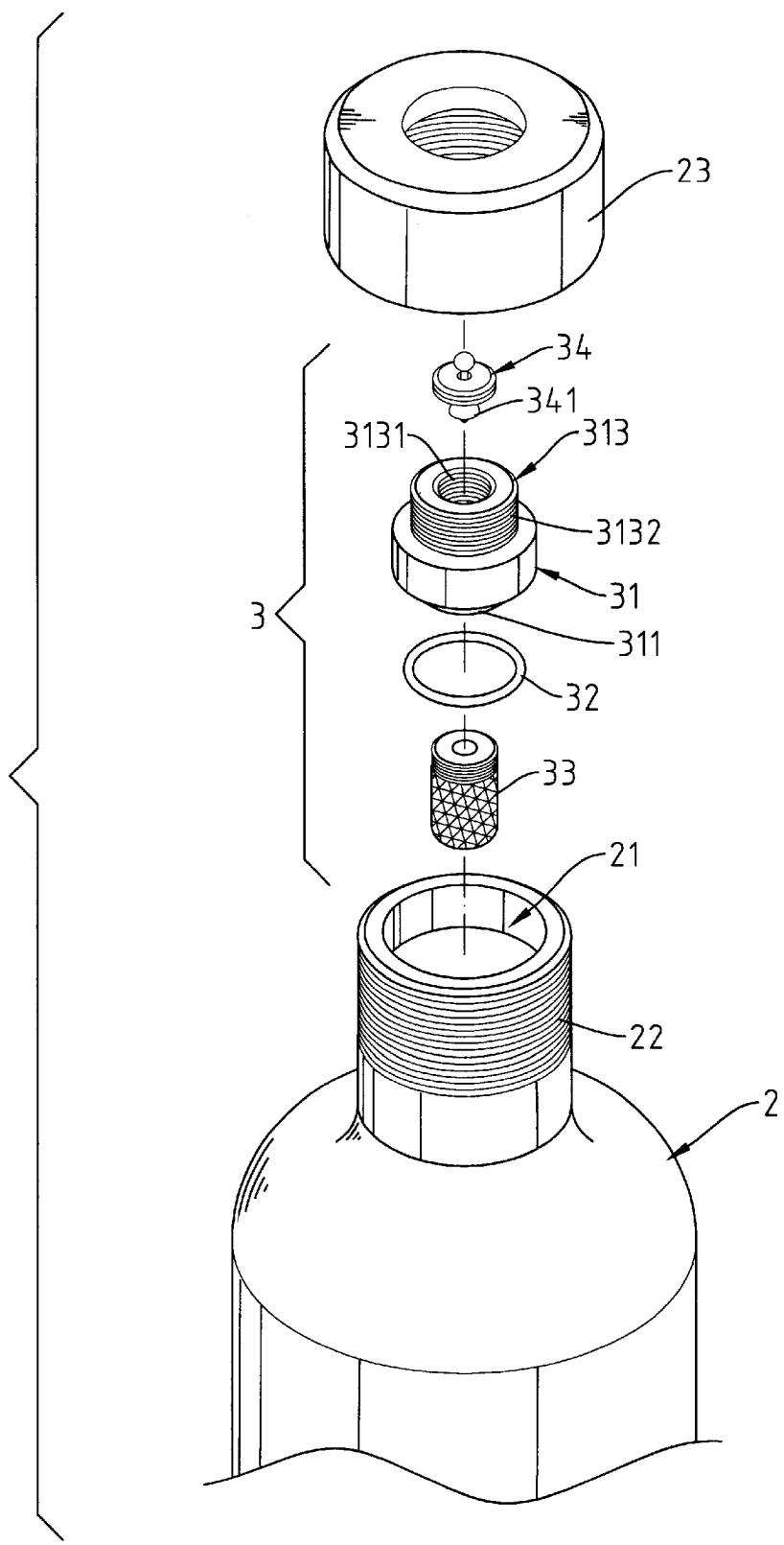
FIG. 2 illustrates a decomposition diagram for the components of the present invention.

Please refer to FIGS. 1 to 4. The hydrogen storage and transportation system of the present invention comprises hydrogen storage alloy 1, storage tank 2, a control valve unit 3 and heat exchange system 4. The hydrogen storage alloy 1 is an alloy that stores hydrogen in a solid state and releases hydrogen gas upon heating and absorbs hydrogen upon cooling. The storage tank 2 is loaded with hydrogen storage alloy 1 with a vent hole 21 and outer screw threads 22 on a top neck. The outer screw threads 22 are used for a fixing nut 23 to lock in position. At the bottom of the vent hole 21, there is a downward and inward inclined wedge 211 that accommodates the control valve 3 for controlling the gas passage.

The said control valve unit 3 comprises a main body 31, an O ring 32 and a filter 33. The main body 31 is installed in the vent hole 21. When the top of the main body 31 is pushed tight by the fixing nut 23, a fringe 311 meets the wedge 211, so the O ring can seal the passage. Further, inside the main body 31, there is a passing hole 312 that allows locking the filter 33 at the bottom 312. The filter 33 is made by sintering palladium metal powder to selectively allow hydrogen pass but exclude other gases and impurities. Further, on the top extension of the main body 21, there is a gas valve 313 that connects its inside to the passing hole 312 and has inner screw threads 3131 and outer screw threads 3132. The said inner screw threads 3131 locks a gas sealing device 34. At the bottom of the said device 34, there is a rubber gasket 341 to seal the passing hole 312 under the internal pressure from the storage body 2 in a normal condition.

Figure 3:
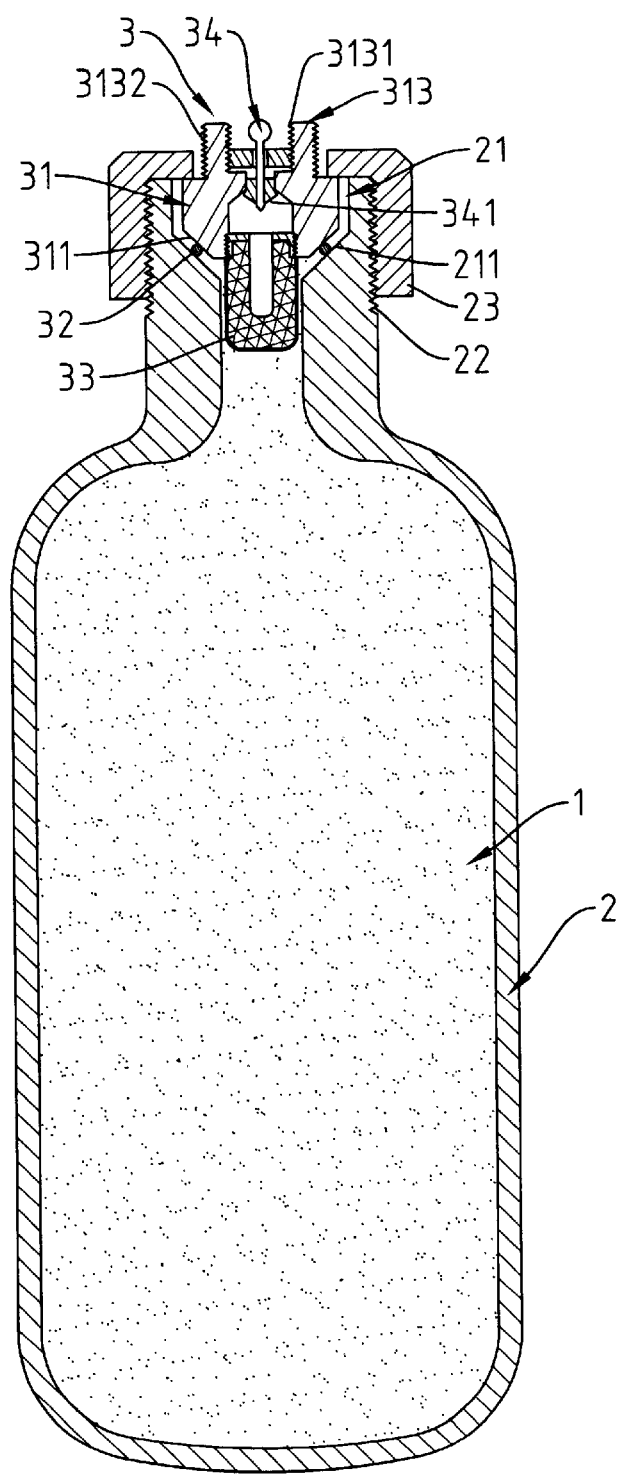
FIG. 3 illustrates a cross-sectional view for the present invention.
Figure 4:
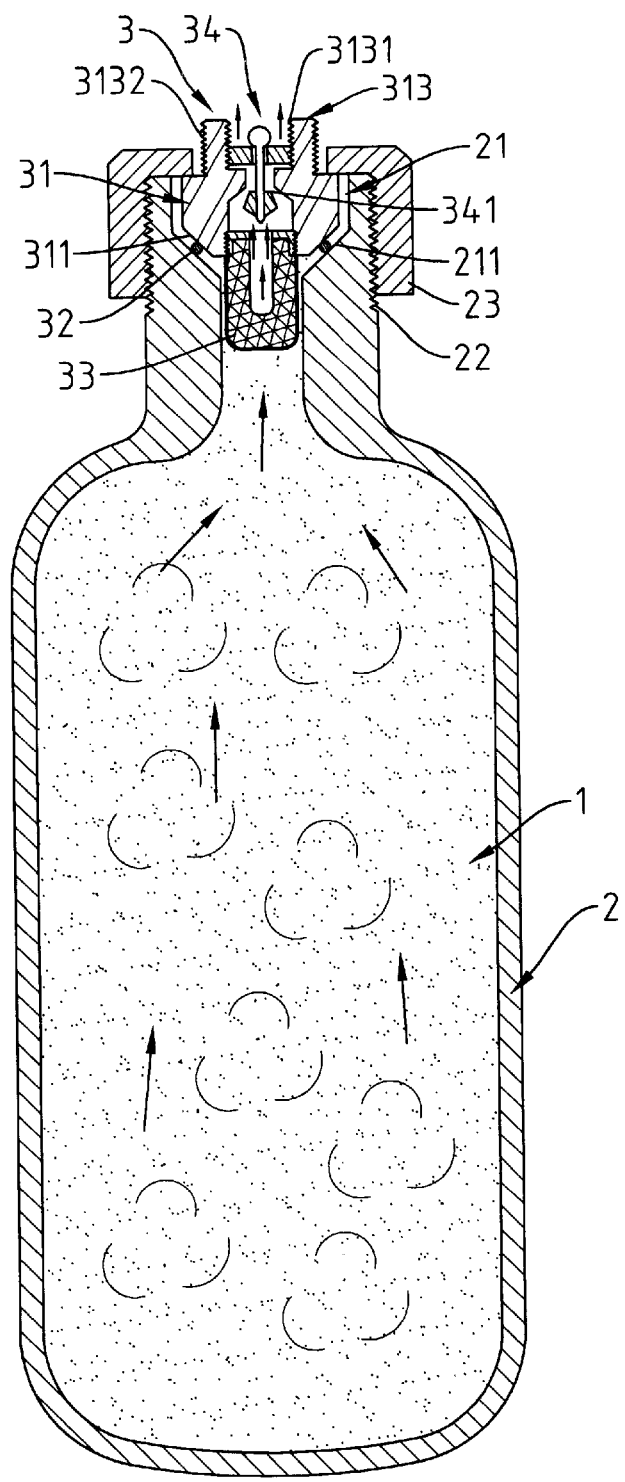
FIG. 4 illustrates a schematic diagram for hydrogen absorbing and hydrogen releasing for hydrogen storage alloy of the present invention.

FIG. 3 indicates when the outer screw threads 3132 of the gas valve 313 connect to a passage tube and allow hydrogen inflow, the sealing device 34 is subject to a pushing force to move toward the passing hole 312 and a rubber gasket 341 stops sealing the passing hole 312. Therefore, hydrogen gas enters the passing hole 312 and further arrives into the storage tank 2 after filtration by the filter 33. At this moment, the hydrogen alloy 1 inside the storage tank 2 can absorb the incoming hydrogen gas and transforms it in large quantity into a solid state to be kept inside the storage body 2. Thus, high-pressure gas storage facility is not necessary for hydrogen storage.

When the storage tank 2 is about to release the hydrogen, a similar pushing force is used to detach the rubber gasket 341 of the sealing device 34 from sealing the passing hole 312. As a result, the hydrogen storage alloy 1 can release the stored hydrogen in gaseous state. The hydrogen gas passes through the filter 33 and is released from the passing hole 312 to enter the hydrogen utilization equipment.

For the implementation of safe storage and transportation, the system for the present invention can be adopted for fuel cells, hydrogen flame and simple cooking equipment. In addition, during the hydrogen absorbing and releasing process, exothermic and endothermic phenomena occur in the hydrogen storage alloy 1 in the storage tank 2. Such unique phenomena can be utilized in the heat exchange system for HVAC or heat pump. The present invention presents great practical value for applications.

Figure 5:
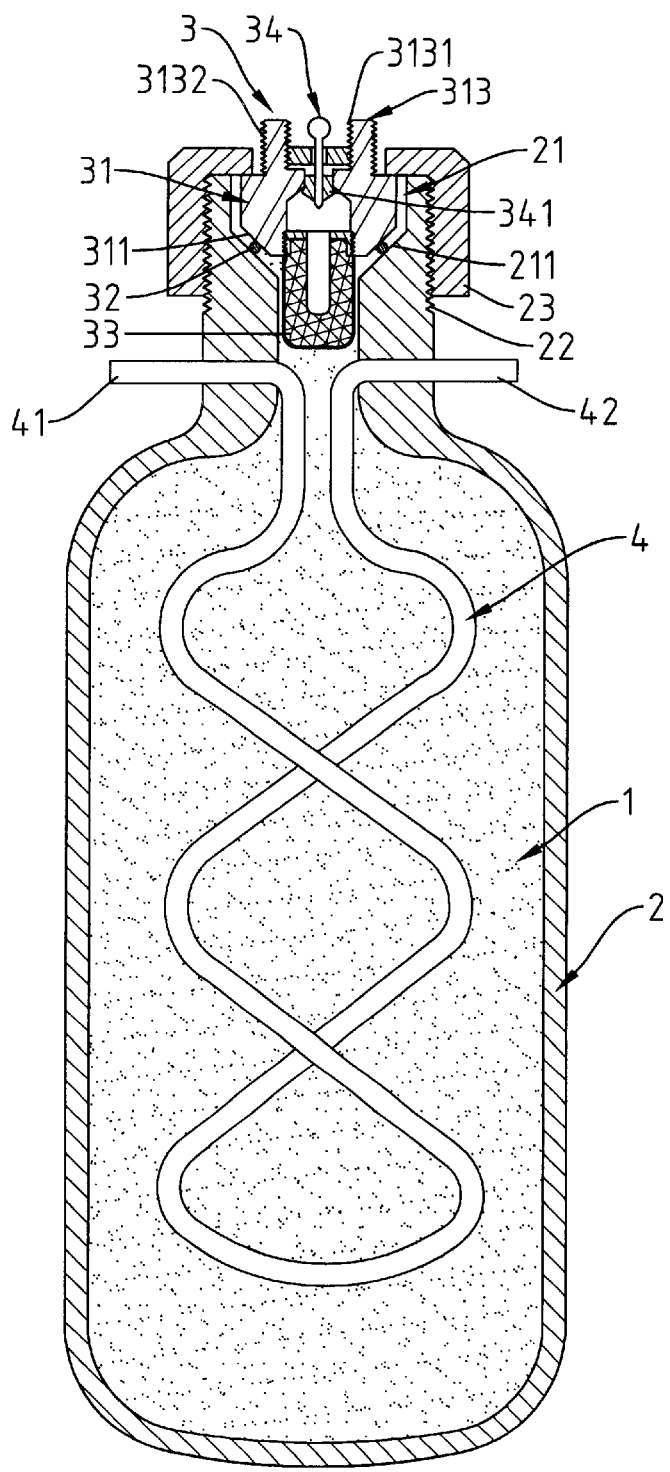
FIG. 5 illustrates another preferred embodiment for the present invention.

Furthermore, in FIG. 5 that illustrates the structure for hydrogen storage alloy container, to accelerate the hydrogen absorbing and releasing process for the hydrogen storage alloy 1, a heat exchange system 4 can be installed inside the storage tank 1 to regulate the gas pressure and flow rate for the hydrogen absorbing and releasing. The said heat exchange system 4 has extension of an inlet 41 and an outlet 42 on the neck of the storage tank 2. Upon cooling, hydrogen is delivered in at the inlet 41 and given out at the outlet 42. In this way, the thermal energy flow is accelerated by heating the hydrogen storage alloy 1. This proves the present invention possesses practical application value and improvement.

What is claimed is:

1. A hydrogen storage and transportation system comprising:
   a) a hydrogen storage alloy for storing hydrogen in a solid state, such that hydrogen is absorbed when the hydrogen storage alloy is cooled and stored hydrogen is released when the hydrogen storage alloy is heated;
   b) a storage tank having a vent hole and containing the hydrogen storage alloy;

c) a control valve connected to the vent hole of the storage tank to regulate the flow of hydrogen into and out of the storage tank, the control valve having:
  i) a main body with a passage hole;
  ii) a filter connected to a bottom of the passage hole, the filter being made from sintering palladium powder to selectively allow hydrogen flow and exclude other gases and impurities;
  iii) a gas sealing device connected to a top of the passage hole; and
  iv) an O-ring connected to a bottom of the main body, such that when the control value is connected to the vent hole the O-ring is compressed between the control valve and the storage tank to prevent leakage; and
d) a heat exchange system extending into the storage tank to regulate gas pressure and flow rate of the hydrogen by controlling the temperature of the hydrogen storage alloy, thereby regulating absorption and release of hydrogen from the hydrogen storage alloy.

2. The hydrogen storage and transportation system according to claim 1, wherein the storage tank has a fixing nut threadedly connecting the control valve to the storage tank.

3. The hydrogen storage and transportation system according to claim 1, wherein the vent hole has an inclined wedge, and the control valve has a fringe, such that when the control value is connected to the vent hole the O-ring is compressed between the fringe of the control valve and the inclined wedge of the storage tank.

4. The hydrogen storage and transportation system according to claim 1, wherein the heat exchange system has an inlet and an outlet, the inlet and the outlet extend into and out of the storage tank.

* * * * *